United States Patent
Yuan et al.

(10) Patent No.: US 11,415,660 B2
(45) Date of Patent: Aug. 16, 2022

(54) POSITIONING COMMUNICATION DEVICE, POSITIONING METHOD, AND COMPUTER STORAGE MEDIUM

(71) Applicant: NINEBOT (BEIJING) TECH. CO., LTD, Beijing (CN)

(72) Inventors: Yubin Yuan, Beijing (CN); Ibraheem Inam, Beijing (CN); Guanjiao Ren, Beijing (CN); Zhu Hou, Beijing (CN); Zhongyuan Chen, Beijing (CN)

(73) Assignee: NINEBOT (BEIJING) TECH CO., LTD, Beijing (CN)

( * ) Notice: Subject to any disclaimer, the term of this patent is extended or adjusted under 35 U.S.C. 154(b) by 164 days.

(21) Appl. No.: 16/641,814

(22) PCT Filed: Dec. 19, 2018

(86) PCT No.: PCT/CN2018/122172
§ 371 (c)(1),
(2) Date: Feb. 25, 2020

(87) PCT Pub. No.: WO2019/205678
PCT Pub. Date: Oct. 31, 2019

(65) Prior Publication Data
US 2020/0355783 A1 Nov. 12, 2020

(30) Foreign Application Priority Data
Apr. 28, 2018 (CN) .......................... 201810402270.3

(51) Int. Cl.
*G01S 5/04* (2006.01)
*G01S 5/02* (2010.01)

(52) U.S. Cl.
CPC .............. *G01S 5/04* (2013.01); *G01S 5/0268* (2013.01); *G01S 5/02213* (2020.05)

(58) Field of Classification Search
CPC ........ G01S 5/04; G01S 5/02213; G01S 5/0268
(Continued)

(56) References Cited

U.S. PATENT DOCUMENTS

| 4,549,311 A | * | 10/1985 | McLaughlin | ........ | H04B 7/0808 |
| | | | | | 455/166.1 |
| 5,596,333 A | * | 1/1997 | Bruckert | .................. | G01S 3/30 |
| | | | | | 342/457 |

(Continued)

FOREIGN PATENT DOCUMENTS

| CN | 1605165 A | 4/2005 |
| CN | 102892140 A | 1/2013 |

(Continued)

OTHER PUBLICATIONS

International Search Report in the international application No. PCT/CN2018/122172, dated Mar. 4, 2019, 2 pgs.

*Primary Examiner* — Chuong P Nguyen
(74) *Attorney, Agent, or Firm* — Cooper Legal Group, LLC

(57) ABSTRACT

Disclosed are a positioning communication device, a positioning method, and a computer storage medium. The positioning communication device comprises: at least two positioning antenna groups (111), at least used for receiving a positioning signal sent by a beacon, wherein each positioning antenna group (111) comprises two positioning antennas arranged separately, and the positioning ranges of different positioning antenna groups (111) are at least partially different; a selection switching module (112) respectively connected to the at least two positioning antenna groups (111); and a processing module (113), connected to the positioning antenna groups (111) by means of the selection switching module (112), and used for controlling, according to orientation information of the beacon at a previous moment, the positioning antenna group (111) turned on by (Continued)

the selection switching module (112), and determining, according to the positioning signal received by the positioning antenna group (111) turned on, orientation information of the beacon at the current moment.

9 Claims, 3 Drawing Sheets

(58) Field of Classification Search
USPC .......................................... 342/386, 432, 437
See application file for complete search history.

(56) References Cited

U.S. PATENT DOCUMENTS

| | | | | |
|---|---|---|---|---|
| 5,825,762 | A * | 10/1998 | Karnin, Jr. | H01Q 3/40 370/335 |
| 6,078,571 | A * | 6/2000 | Hall | H04B 7/2628 370/331 |
| 6,169,898 | B1 * | 1/2001 | Hsu | H04W 28/24 455/432.3 |
| 8,009,646 | B2 * | 8/2011 | Lastinger | H04B 17/15 370/338 |
| 8,111,678 | B2 * | 2/2012 | Lastinger | H04B 17/15 455/452.2 |
| 8,270,383 | B2 * | 9/2012 | Lastinger | H04B 7/0495 455/452.2 |
| 9,590,300 | B2 * | 3/2017 | Artemenko | H01Q 21/065 |
| 9,933,507 | B2 * | 4/2018 | Afzal | G01S 5/12 |
| 10,539,649 | B2 * | 1/2020 | Howard | G01S 5/04 |
| 11,089,595 | B1 * | 8/2021 | Frigon | H04W 72/046 |
| 11,108,444 | B2 * | 8/2021 | Varatharaajan | H04B 7/0478 |
| 2016/0327631 | A1 | 11/2016 | Salokannel et al. | |
| 2017/0300717 | A1 | 10/2017 | Hu et al. | |
| 2018/0330117 | A1 | 11/2018 | Hu et al. | |
| 2020/0116819 | A1 * | 4/2020 | Howard | G01S 3/043 |

FOREIGN PATENT DOCUMENTS

| | | |
|---|---|---|
| CN | 104062627 A | 9/2014 |
| CN | 105025571 A | 11/2015 |
| CN | 105319532 A | 2/2016 |
| CN | 105556410 A | 5/2016 |
| CN | 106019221 A | 10/2016 |
| CN | 106900056 A | 6/2017 |
| CN | 106935983 A | 7/2017 |
| CN | 107154532 A | 9/2017 |
| CN | 107368066 A | 11/2017 |
| CN | 107728137 A | 2/2018 |
| CN | 108594171 A | 9/2018 |
| EP | 2131443 A1 | 12/2009 |

* cited by examiner

POSITIONING COMMUNICATION DEVICE, POSITIONING METHOD, AND COMPUTER STORAGE MEDIUM

CROSS-REFERENCE TO RELATED APPLICATION

This application is based upon and claims priority to Chinese patent application No. 201810402270.3 filed on Apr. 28, 2018, the disclosure of which is hereby incorporated by reference in its entirety.

TECHNICAL FIELD

The disclosure relates, but is not limited, to the technical field of communications, and in particular to a positioning communication device, a positioning method, and a computer storage medium.

BACKGROUND

Along with the continuous development of science and technology, a communication positioning technology, particularly, an Ultra Wide Band (UWB) carrier-free communication technology, is developed rapidly. The UWB was applied to short-distance high-speed data transmission in an early stage. In recent years, a sub-nanosecond ultra-narrow pulse of the UWB has been utilized for short-distance accurate positioning.

The UWB positioning has the characteristics of high accuracy, small size, low power consumption and the like, and thus has a wide application prospect. Particularly, when a Phase Difference of Arrival (PDOA) positioning algorithm based on a signal arrival angle is used for positioning, the relatively high positioning accuracy can be achieved under an ideal condition. When the PDOA method is employed for positioning, a system is divided into two parts, one being an anchor node and the other being a beacon. The beacon can send a positioning signal which is used for positioning by the anchor node. The anchor node can determine orientation information of the beacon relative to itself according to the received positioning signal.

As illustrated in FIG. 1, when the beacon is located near a middle of front surfaces of two positioning antennas (referring to position 1 in FIG. 1), measurement accuracy is high. When the beacon is located on two sides or a back of the anchor node (referring to the position 2 in FIG. 1), measurement accuracy is reduced.

SUMMARY

According to a first aspect, in an embodiment of the disclosure, there is provided a positioning communication device, which includes at least two positioning antenna groups, a selection switching module, and a processing module.

The at least two positioning antenna groups are at least configured to receive a positioning signal sent by a beacon. Each positioning antenna group includes two positioning antennas disposed separately, and positioning ranges of different positioning antenna groups are at least partially different; and The selection switching module is respectively connected to the at least two positioning antenna groups.

The processing module is connected to the positioning antenna groups via the selection switching module, and is configured to control, according to orientation information of the beacon at a previous moment, a positioning antenna group conducted by the selection switching module, and determine, according to the positioning signal received by the conducted positioning antenna group, orientation information of the beacon at a current moment.

According to a second aspect, in an embodiment of the disclosure, there is provided a positioning method, which includes the following operations.

A positioning antenna group conducted by a selection switching module is controlled according to orientation information of a beacon at a previous moment, and positioning ranges of different positioning antenna groups are at least partially different.

The conducted positioning antenna group at least receives a positioning signal sent by the beacon.

Orientation information of the beacon at a current moment is determined according to the positioning signal.

According to a third aspect, in an embodiment of the disclosure, a non-transitory computer storage medium storing a computer executable instruction is provided; and the computer executable instruction can perform, after being executed, the positioning method in the above second aspect.

DETAILED DESCRIPTION

The technical solutions of the disclosure are further described below in detail in combination with the accompanying drawings and specific embodiments of the specification.

Figure 1:
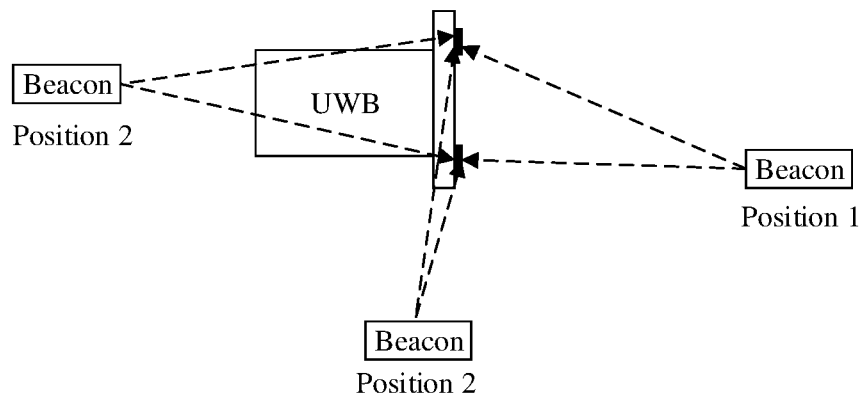
FIG. 1 illustrates a structural diagram of a positioning communication device.
Figure 2:
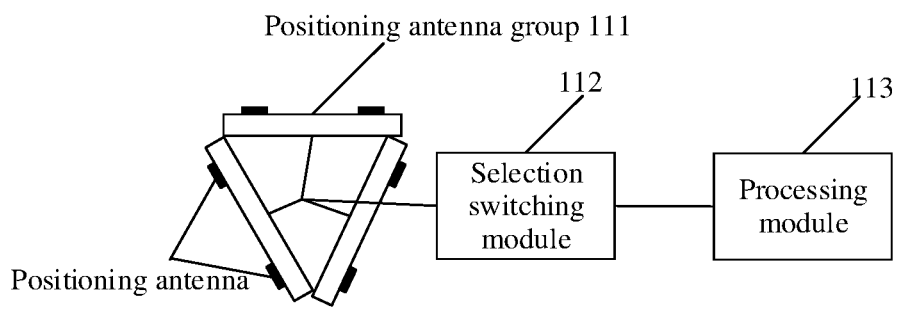
FIG. 2 illustrates a structural diagram of a first positioning communication device according to an embodiment of the disclosure.

As illustrated in FIG. 2, in an embodiment, a positioning communication device is provided. The device includes: at least two positioning antenna groups 111, a selection switching module and a processing module 113.

The at least two positioning antenna groups 111 are at least configured to receive a positioning signal sent by/from a beacon. Each positioning antenna group 111 includes two positioning antennas disposed/arranged separately. Positioning ranges of different positioning antenna groups 111 are at least partially different.

The selection switching module 112 is respectively connected to/with the at least two positioning antenna groups 111.

The processing module 113 is connected to the positioning antenna groups 111 via/by means of the selection switching module 112, and configured to control, according to orientation information of the beacon relative to/with respect to the positioning communication device at a previous moment, a positioning antenna group 111 conducted/turned on by the selection switching module 112, and determine, according to the positioning signal provided by the conducted positioning antenna group 111, orientation information of the beacon relative to the positioning communication device at a current moment.

The positioning communication device can be an anchor node of a UWB positioning system.

In this embodiment, one positioning communication device includes at least two positioning antenna groups 111, each positioning antenna group 111 includes two positioning antennas, and the two positioning antennas are spaced apart. The two positioning antennas can be disposed on a same bearing surface, for example, the two positioning antennas are disposed at different positions of a same horizontal Printed Circuit Board (PCB). In this embodiment, the positioning antenna can be an orientating antenna, which is an antenna capable of only receiving a signal in a predetermined direction. For example, the positioning antenna includes a receiving surface and a non-receiving surface. The non-receiving surface is attached to the bearing surface, so as to mount the positioning antenna. The receiving surface is deviated from/faces away from the bearing surface, and configured to receive the positioning signal transmitted/sent by the beacon.

In this embodiment, in order to reduce mutual interference between the non-receiving surfaces of antennas in different antenna groups, a shielding area can be disposed in an area corresponding to each antenna in each antenna group. The shielding area can shield the orientating antenna from receiving the positioning signal from the back. A metal layer or a metal block isolated from the antenna can be disposed in the shielding area.

In this embodiment, positioning ranges of different positioning antenna groups 111 are at least partially different, compared with the single positioning antenna group, the range of the positioning communication device for receiving the positioning signal transmitted by the beacon is expanded on one hand; therefore the beacon can also be positioned accurately when being located on the side or the back of the positioning communication device, and positioning beacon range and accuracy of the positioning communication device are improved. In this embodiment, the positioning range is a spatial range in which the corresponding positioning antenna group can receive the signal transmitted by the beacon. In this embodiment, the beacon can send the positioning signal. The positioning signal includes time information of the beacon for sending the positioning signal, for example, includes a timestamp of the beacon for sending the positioning signal. The positioning antenna group 111 can at least receive the positioning signal, and transmit the received positioning signal to the processing module 113. In some embodiments, the positioning antenna group 111 can further be used by the positioning communication device to send a positioning signal to the beacon. In this embodiment, the positioning signal can be a signal for positioning the beacon.

In this embodiment, one positioning antenna group 111 includes two positioning antennas disposed separately. In this way, since positions of the two positioning antennas in one positioning antenna group 111 relative to the beacon are different, receiving time of the received positioning signal is different. The processing module 113 can calculate, according to a time difference of the two positioning antennas in the one positioning antenna group 111 receiving the positioning signal, a phase difference of the beacon relative to the two positioning antennas. For example, the processing module can calculate an orientation angle of the beacon relative to a central point of the bearing surface of the corresponding positioning antenna group 111; upon the determination of the orientation angle, the processing module can further determine a distance between the beacon and the positioning communication device according to sending time and actual receiving time included in the positioning signal together with a transmission rate of the positioning signal. In this embodiment, the orientation information at least includes an orientation angle. In some embodiments, in addition to the orientation angle, the orientation information further includes a distance of the beacon relative to the positioning communication device, and other information.

In other embodiments, the processing module 113 in the communication positioning device can determine the orientation information of the beacon relative to the positioning communication device by using Two-Way Ranging (TWR). For example, the positioning communication device and the beacon position the beacon by using the TWR method. In order to position the beacon, the ranging at each time is based on three times of communication.

First, the beacon sends a first positioning signal, and the first positioning signal includes transmitting time tt1 of the first positioning signal. The positioning antenna group 111 conducted by the positioning communication device receives the first positioning signal, and records receiving time ta1 of the first positioning signal.

Second, the positioning antenna group 111 conducted by the positioning communication device sends a second positioning signal, and the second positioning signal includes transmitting time tt2 of the second positioning signal; and the beacon receives the second positioning signal, and records receiving time ta2 of the second positioning signal.

Third, the beacon sends a third positioning signal, and the third positioning signal includes transmitting time tt3 of the third positioning signal. The positioning antenna group 111 conducted by the positioning communication device receives the third positioning signal, and records receiving time ta3 of the third positioning signal.

Fourth, the positioning communication device makes calculations according to the following formulas:

$$T\ \text{round1} = tt2 - tt1;$$

$$T\ \text{reply1} = ta2 - ta1;$$

$$T\ \text{round2} = ta3 - ta2;\ \text{and}$$

$$T\ \text{reply2} = tt3 - tt2.$$

T round1 denotes a time/period during which the first positioning signal is sent from the beacon and is received by the communication positioning device, and T reply1 denotes a time during which the positioning communication device feeds back the second positioning signal.

T round2 denotes a time during which the second positioning signal is sent from the positioning communication device and the beacon receives the feedback, and T reply2 denotes a time during which the beacon sends the third positioning signal.

T=(Tround1−Treply 1)/2 denotes a traveling time during which the first positioning signal is sent from the beacon to the positioning communication device. Therefore, a distance DIS between the beacon device and the positioning communication device is obtained by using DIS=T*V, where V is a propagation speed of a signal, and is a known amount.

In this embodiment, the positioning communication device is provided with multiple positioning antenna groups 111. However, the multiple positioning antenna groups 111 can share one processing module 113, and the multiple positioning antenna groups 111 are connected to/with the processing module 113 via the selection switching module 112. The selection switching module 112 can conduct one positioning antenna group 111 at a time/each time, and the conducted positioning antenna group 111 transmits the received positioning signal to the processing module 113. After the positioning ranges of the multiple positioning antenna groups 111 are merged, a positioning range of the positioning communication device reaches to 360°. That is, with the positioning communication device as the center, the positioning antenna groups 111 can receive the positioning signal within a 360° range, so that the positioning communication device successfully receives the positioning signal sent by the beacon at any angle.

The selection switching module 112 can correspond to a channel switching switch chip. The selection switching module 112 only conducts one positioning antenna group 111 at a time. The conducted positioning antenna group 111 transmits the received positioning signal provided by the beacon, via a link formed by conducting the selection switching module 112, to the processing module 113. The processing module 113 determines, according to a position of the positioning antenna group 111 providing the positioning signal, a timestamp included in the positioning signal, receiving time when the positioning signal is received, and the like, the orientation information of the beacon relative to the positioning communication device at a current moment.

In this embodiment, the multiple positioning antenna groups 111 share one processing module 113 via the selection switching module 112, rather than that each positioning antenna group 111 is individually provided with one processing module 113, so that the processing module 113 used in the positioning communication device is reduced, and the characteristics of few processing module 113, simple structure and low hardware cost are achieved. Meanwhile, the miniaturization, lightness and thinness of the positioning communication device are implemented conveniently due to the fewer processing module 113.

Figure 3:
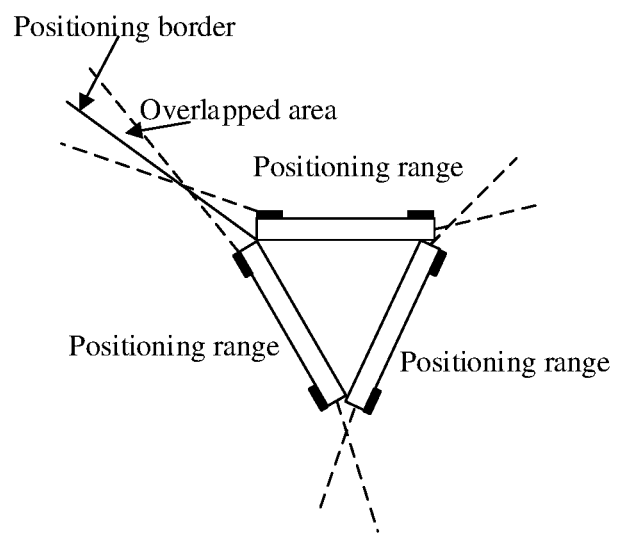
FIG. 3 illustrates a coverage diagram of positioning ranges of two adjacent positioning antenna groups according to an embodiment of the disclosure.

As illustrated in FIG. 3, after the positioning ranges of the at least two positioning antenna groups 111 are merged, a positioning range of 360° is formed. The positioning ranges of two adjacent positioning antenna groups 111 have an overlapped area. In this embodiment, orientations of the receiving surfaces of two adjacent positioning antenna groups 111 are different, but the positioning ranges are partially overlapped, thus forming the overlapped area. If the beacon is located in the overlapped area, the two adjacent positioning antenna groups 111 can both receive the positioning signal transmitted by the beacon. At this time, by conducting any one positioning antenna group 111, the positioning signal of the beacon can be received. Herein, the positioning range is the position corresponding to the orientation of the positioning antenna group 111, so that the positioning signal provided by the beacon can be received.

The overlapped area is located within edge areas of the positioning ranges of the two adjacent positioning antenna groups 111. In this way, the use of the positioning antenna groups 111 in the positioning communication device can be reduced as few as possible.

With the arrangement of the overlapped area of the two adjacent positioning antennas, the 360° positioning detection of the positioning communication device to the beacon can be guaranteed absolutely, and the positioning signal transmitted by the beacon at any orientation can be successfully received by the positioning communication device.

In some embodiments, an angle of the overlapped area is a second preset angle. For example, if three positioning antenna groups 111 are provided and the receiving angle of each positioning antenna group 111 is 150°, the overlapped angle (i.e., the second preset angle) corresponding to the overlapped range of two adjacent positioning antenna groups 111 is 30°. In this embodiment, a positioning border of two adjacent positioning antenna groups 111 is disposed in the overlapped area. The positioning border is an angular bisector of the 30° overlapped angle, that is, the positioning border is located at a central position of the overlapped area. In some embodiments, the positioning border is not limited to the central position of the overlapped area, and can also be other position of the overlapped area.

The processing module 113 is specifically configured to determine, according to the orientation information at the previous moment, whether the beacon crosses/exceeds the positioning border of the two adjacent positioning antenna groups 111 for a first preset angle, and if yes, the processing module is configured to control the selection switching module 112 to conduct the corresponding positioning antenna.

In this embodiment, only after the beacon crosses the positioning border of the two adjacent positioning antenna groups 111 for the first preset angle, the switching of the positioning antenna group 111 is performed. For example, due to the instability of the movement of the beacon, if the conducted positioning antenna group 111 is switched once the beacon crosses the positioning border, it is possible that the conduction of two adjacent positioning antenna groups 111 is switched back and forth, and thus the positioning stability is reduced, and the power consumption of the positioning communication device is increased. Therefore, with the arrangement of the first preset angle, the position of the beacon not only needs to cross the positioning border in the overlapped area, but also needs to be higher than the positioning border for a certain angle (with respect to the above first preset angle). Because of the continuity of the movement, if the beacon crosses the positioning border for a certain angle, it is indicated that the beacon further needs a certain time to cross the positioning border again, and it is apparent that the conducted positioning antenna group 111 is not switched back and forth. The decrease in the positioning stability and accuracy due to the back-and-forth switching is reduced, and the switching power consumption caused by unnecessary switching is further reduced.

For example, the beacon rotates counterclockwise relative to the positioning communication device to cross the positioning border of the first positioning antenna group 111 and the second positioning antenna group 111, and the angle that the beacon continues to move to the first positioning antenna group 111 exceeds the first preset angle. The selection switching module 112 is switched from the conducted second positioning antenna group 111 so as to conduct the first positioning antenna group 111, and thus the first positioning antenna group 111 is used to receive the positioning signal to position the beacon. Also for example, the beacon rotates counterclockwise relative to the positioning communication device to cross the positioning border of the first positioning antenna group 111 and the second positioning antenna group 111, and the angle that the beacon continues to move to the second positioning antenna group 111 exceeds the first preset angle. The selection switching module 112 is switched from the conducted first positioning antenna group 111 so as to conduct the second positioning antenna group 111.

The first preset angle is smaller than or equal to one half of the second preset angle. For example, if the second preset angle is 30°, the first preset angle is smaller than or equal to 15° with the angular bisector of the overlapped area as one edge. For example, the first preset angle can be 10° or 12°, etc.

In some embodiments, N positioning antenna groups 111 are provided, and the N is a positive integer not smaller/less than 2.

The receiving angle of one positioning antenna group 111 is not smaller than 360/N°.

For example, if N is equal to 2, the receiving angle of one positioning antenna group 111 is not smaller than 180°. If N is equal to 3, the receiving angle of one positioning antenna group 111 is not smaller than 120°. If N is equal to 4, the receiving angle of one positioning antenna group 111 is not smaller than 90°; and the N is equal to 5, the receiving angle of one positioning antenna group 111 is not smaller than 72°.

In some embodiments, if two adjacent positioning antenna groups 111 have a minimum overlapped angle, the receiving angle of one positioning antenna group 111 is not smaller than a sum of 360/N and the minimum overlapped angle. For example, the minimum overlapped angle is not smaller than two times of the first preset angle.

In some embodiments, the processing module 113 is further configured to control the selection switching module 112 to sequentially conduct the positioning antenna groups 111 in a positioning preparatory stage, determine initial orientation information of the beacon according to the positioning signals provided by the positioning antenna groups 111, and determine, according to the initial orientation information, a first positioning antenna group 111 to be conducted in a positioning stage and activate the positioning of the beacon.

For example, the processing module 113 can sequentially control, in the preparatory stage, the selection switching module 112 to conduct the positioning antenna groups 111 according to a preset sequence, so that multiple groups of positioning signals provided by the positioning antenna groups 111 are received. For example, the positioning communication device includes N positioning antenna groups 111, N groups of positioning signals are received, and N pieces of orientation information can be determined based on the N groups of positioning signals. In combination with the N pieces of orientation information, the orientation information with a minimum error at present can be determined. Generally, the beacon is located in a central area of the positioning range of the positioning antenna group 111 having the orientation information with the minimum error. In some embodiments, the overlapped area of two adjacent positioning antenna groups 111 is located in an edge area out of the midline areas of the corresponding positioning antenna groups 111.

By sequentially conducting the positioning antenna groups 111 in the preparatory stage, the initial orientation information of the beacon relative to the positioning communication device can be positioned accurately. Based on the initial orientation information, the first positioning antenna group 111 to be conducted in the positioning stage is determined. After the first positioning antenna group 111 is conducted, the positioning antenna group 111 to be conducted at a current moment is determined according to the orientation information at a previous moment. The above operations are executed continuously; and therefore, the accurate positioning of the beacon is implemented.

For example, the current positioning communication antenna includes three positioning antenna groups 111 having/with the receiving angle of 150°. In the preparatory stage, the processing module 113 respectively controls the selection switching module 112 to sequentially conduct the positioning antenna group 1, the positioning antenna group 2 and the positioning antenna group 3, so that three groups of positioning signals are respectively obtained, and three pieces of suspected orientation information are calculated. In combination with the three pieces of suspected orientation information, initial orientation information of the beacon relative to the positioning communication device is calculated. If the initial orientation information indicates that the beacon is located in the midline area of the positioning range of the positioning antenna group 1, the selection switching module 112 is controlled to switch from the conducted positioning antenna group 111 and conducts the positioning antenna group 1, and the positioning antenna group 1 is activated to position the beacon. The orientation information of the beacon relative to the positioning communication device is determined according to the positioning signal provided by the positioning antenna group 1, and the selection switching module is controlled to select the positioning antenna group 111 to be conducted.

In some embodiments, the processing module 113 processes, according to a predetermined period, the positioning signals provided by the conducted positioning antenna modules 111, so as to obtain the orientation information of the beacon relative to the positioning communication device. The duration of the first period is a first duration, the duration that the selection switching module 112 switches the conducted positioning communication module is a second duration, and the second duration is smaller than the first duration. In some embodiments, the processing module 113 receives the positioning signal provided by the conducted positioning antenna group 111 within a first time interval of the predetermined period, and controls the selection switching module 112 to switch the conducted positioning antenna group 111 within a second time interval of the predetermined period. In some embodiments, the second time interval and the first time interval are not overlapped in time domain, and the second time interval is earlier than the first time interval. In this way, it is assured that the operation that the selection switching module 112 switches the conducted positioning antenna group 111 does not affect the reception of the positioning signal, the stable reception of the positioning signal of the positioning communication device is implemented, and the stability of the positioning is improved.

Figure 4:
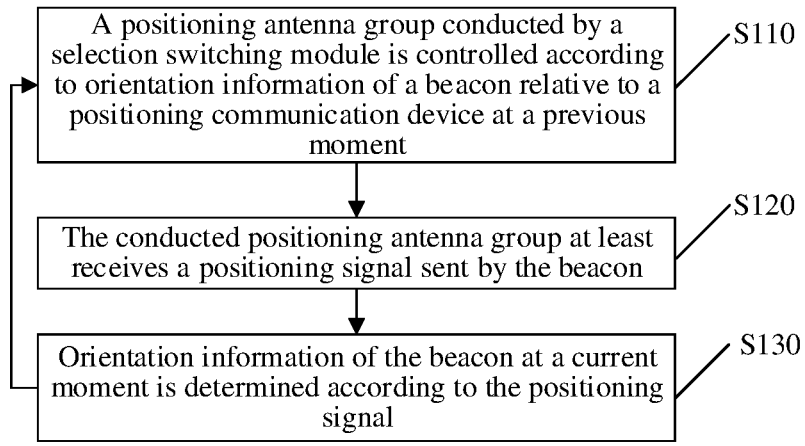
FIG. 4 illustrates a flow chart of a first positioning method according to an embodiment of the disclosure.

As illustrated in FIG. 4, in an embodiment, a positioning method is provided. The method includes the following operations.

At S110: a positioning antenna group conducted by a selection switching module is controlled according to orientation information of a beacon relative to a positioning communication device at a previous moment.

At S120: the conducted positioning antenna group at least receives a positioning signal sent by the beacon.

At S130: orientation information of the beacon at a current moment is determined according to the positioning signal.

The positioning method in this embodiment can be a method applied to the above positioning communication device. A positioning antenna is selected to be conducted according to orientation information of a beacon relative to a positioning communication device at a previous moment.

The conducted positioning antenna group at least receives a positioning signal sent by the beacon. The positioning signal is a positioning signal received by the positioning antenna group and the beacon.

Orientation information of the beacon relative to the positioning communication device at a current moment is determined according to the positioning signal, and the above operations are executed repeatedly. In this embodiment, the selection switching module can only conduct one positioning antenna group at each moment; and the positioning range of the conducted positioning antenna group includes a position where the beacon is located. Since the positioning ranges of different positioning antenna groups are at least partially different in this embodiment, the range where the positioning communication device positions the beacon is expanded firstly, for example, the positioning communication device can position the beacon located on a side or a back. Secondly, the positioning accuracy of the positioning communication device can further be improved overall. Thirdly, in this embodiment, multiple positioning antenna groups are conducted by the selection switching module and share one processing module, compared with a manner that one positioning antenna group corresponds to one processing module, the number of processing modules is reduced, the hardware cost is reduced, the structure of the positioning communication device is simplified, and the positioning communication device is convenient to implement the lightness, thinness and miniaturization of the device.

In some embodiments, if the beacon crosses a positioning border of two positioning antenna groups, the positioning antenna group to which a movement direction of the beacon is oriented is selected to be conducted. In this embodiment, in order to prevent the beacon from moving repeatedly at the positioning border of two positioning antenna groups to cause the back-and-forth switching of the two positioning antenna groups, in some embodiments, the step S110 can include the following operations.

If the beacon crosses the positioning border of two adjacent positioning antenna groups for a first preset angle, the positioning antenna group conducted by the selection switching module is switched.

The conducted positioning antenna group is switched only after the beacon crosses the positioning border of two adjacent positioning antenna groups for the first preset angle, so that the unnecessary back-and-forth switching between the positioning antenna groups can be reduced, and the power consumption and the decrease in the positioning stability and accuracy due to the unnecessary back-and-forth switching can further be reduced.

Figure 5:
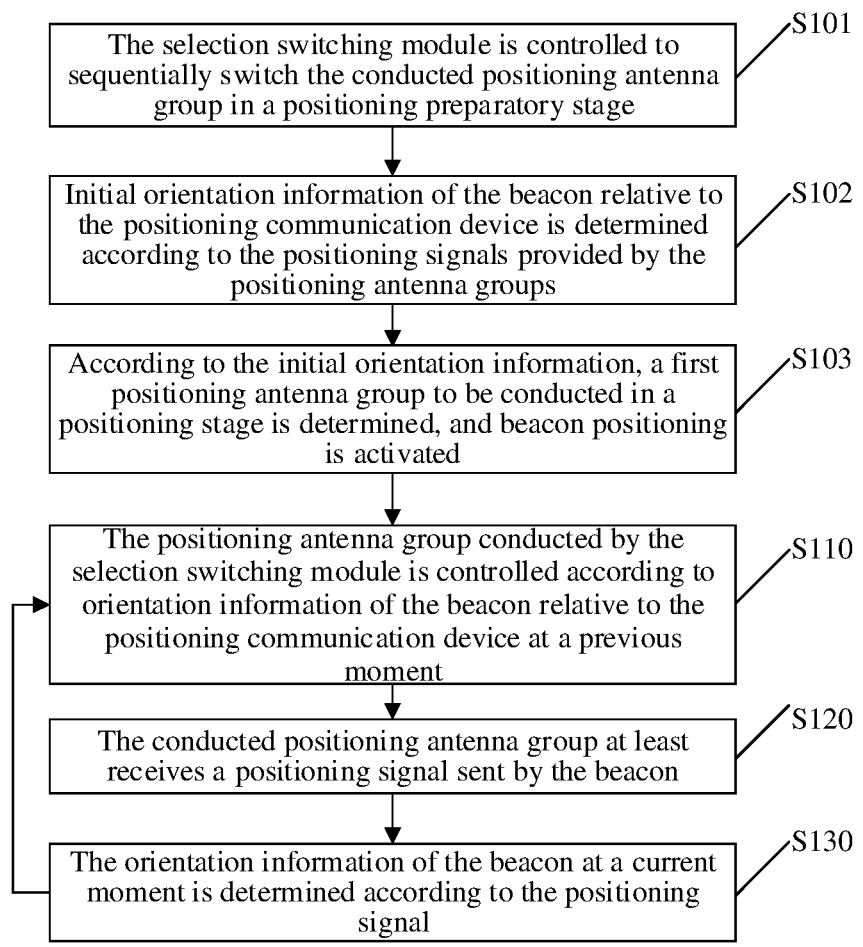
FIG. 5 illustrates a flow chart of a second positioning method according to an embodiment of the disclosure.

In some embodiments, as illustrated in FIG. 5, the method further includes the following operations.

At S101: the selection switching module is controlled to sequentially switch the conducted positioning antenna group in a positioning preparatory stage.

At S102: initial orientation information of the beacon relative to the positioning communication device is determined according to the positioning signals provided by the positioning antenna groups.

At S103: according to the initial orientation information, a first positioning antenna group to be conducted in a positioning stage is determined, and beacon positioning is activated.

In this embodiment, a positioning activation signal can be a start signal of the positioning communication device. For example, physical or virtual control/controller is disposed on the positioning communication device. If it is detected that the control is operated by a user, it can be considered that the positioning activation signal is detected. After the positioning activation signal is detected, the processing module and the selection switching module can enter from a non-working state to a working state, and enter the preparatory stage. By sequentially switching the conducted positioning antenna group 111 in the preparatory stage, the initial orientation information of the beacon can be positioned within a 360° range. Once the initial orientation information is determined, the operation enters the positioning stage. In the positioning stage, according to the initial orientation information, the first positioning antenna group to be conducted in the positioning stage is selected, and step S110 to the step S130 are executed repeatedly.

In an embodiment, a computer storage medium storing a computer executable instruction is further provided. The computer executable instruction can implement, after being executed, the positioning method provided by the above one or more technologies, such as the positioning method illustrated in FIG. 4 or FIG. 5.

The computer executable instruction in this embodiment can be various programs or software. The program can be a source code or a target code or the like of a computer.

The computer storage medium can be various types of storage media, and can include: an optical disc, a mobile hard disk, a flash disk, a random storage medium or a read-only storage medium, etc. The computer storage medium is a non-instantaneous/non-transitory storage medium optionally.

Several specific examples are provided below in combination with the above embodiments.

Example 1

In this example, a UWB device adopting/including multiple UWB antenna groups is provided. The multiple UWB antenna groups in the UWB device share one UWB signal processing chip (corresponding to the above processing module). The coverage areas of the multiple UWB antenna groups reach to the whole spatial range.

A channel switching switch chip (corresponding to the above selection switching module) is introduced to the UWB device. The number of UWB signal processing chips is not increased. However, one channel switching chip of an antenna signal transmission link is increased. The chip can control a selected UWB antenna to connect to the UWB signal processing chip.

Figure 6:
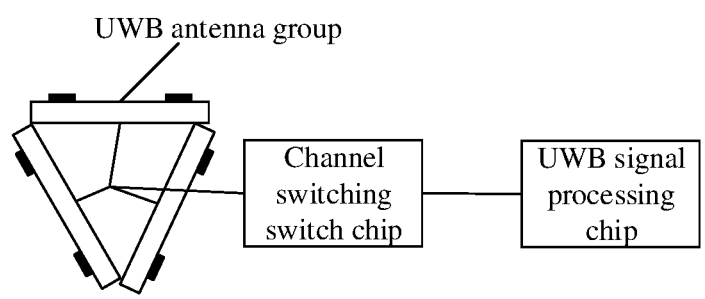
FIG. 6 illustrates a structural diagram of a second positioning communication device according to an embodiment of the disclosure.

As illustrated in FIG. 6, three UWB antenna groups are listed, and a triangular layout is employed. The effective signal receiving range that can be covered by each antenna is 150°. Every two of the three groups of antennas have an overlapped area of 30°. The three groups of antennas can cover the whole space completely at 360°. One channel switching chip controls the three UWB antenna groups to connect to the UWB signal processing chip in a time-sharing manner.

When the UWB is started to work, the channel switching chip controls, according to a set sequence, the three groups of antennas to respectively and sequentially connect to the UWB signal processing chip, and 360° scanning is completed. Therefore, the determination of initial orientation information for positioning a beacon can be completed.

When the beacon starts to move in the space, it is assumed that the UWB antenna corresponding to the initial orientation information is a UWB antenna group 1, and an adjacent UWB antenna group 2 and a UWB antenna group 3 are set counterclockwise sequentially. Therefore, when the beacon starts to move, the beacon is first in a receiving interval of the UWB antenna group 1. When it is found by the UWB signal processing chip that the angle of a perpendicular line of the beacon relative to the UWB antenna group 1 exceeds 65° counterclockwise, the channel switching switch chip controls the UWB antenna group 2 to conduct. At this time, the angle of the perpendicular line of the beacon relative to the UWB antenna group 2 is 55°. If the beacon continues to move counterclockwise, the UWB antenna group 2 is kept connecting to the UWB signal processing chip, and the UWB antenna group 1 is not conducted. However, if the beacon does not continue to move counterclockwise at this time but moves clockwise, the channel selection switching switch does not immediately disconnect the antenna group 2 to connect the UWB antenna group 1, but starts to disconnect the UWB antenna group 2 and connect the UWB antenna group 1 after the clockwise movement angle of the beacon reaches to 10°. If the beacon changes to move counterclockwise, the previous operation logic is repeated. After the counterclockwise movement of the beacon exceeds 10°, the action of connecting the UWB antenna group 2 and disconnecting the UWB antenna group 1 is repeated. Therefore, the hysteresis angular control when one antenna is switched is implemented. When the beacon is fallen into the overlapped area, the adjacent antennas are prevented from being switched back and forth to increase the power consumption and the degree of instability of the system.

If the space is equally divided into three sectors by using/by means of the UWB antenna group 1, the UWB antenna group 2 and the UWB antenna group 3, the signal receiving antenna of the beacon is turned on and off by the channel selection switching chip, and thus the sector of the beacon in the space can be determined. Moreover, the UWB signal processing chip can further accurately know the angle of the perpendicular line of the beacon relative to the UWB antenna in the sector and the distance relative to the UWB antenna, so the omnidirectional relative position of the beacon relative to a substrate where the UWB antenna is located can be obtained, and the omnidirectional positioning in the space is implemented.

Figure 7:
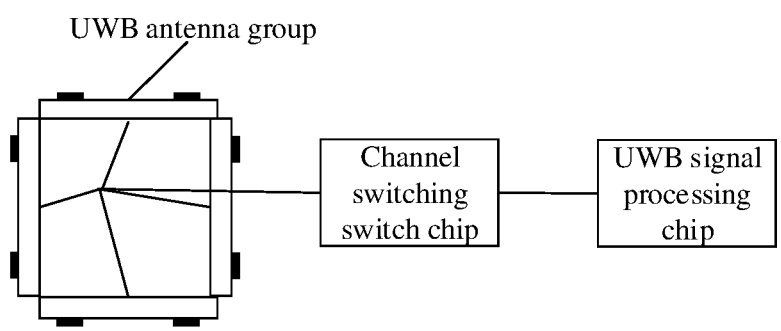
FIG. 7 illustrates a structural diagram of a third positioning communication device according to an embodiment of the disclosure.

As illustrated in FIG. 7, four groups of antennas are used to form into a square layout. Eight paths of channel selection switching chips (herein, one group of antennas needs two paths of channel selection switching chips in fact, so that the form of the antenna is changed; or one path of channel selection switching chips can be used; and the number of the path corresponding to one group of antennas specifically are determined by the characteristics of the antenna) can also be used appropriately, or five groups of antennas are used to form a pentagon, or more groups of antennas are used. The back of the antenna in the layout needs to be shielded, so as to guarantee that the beacon can only have the induction in front of the antenna.

Theoretically, two groups of antennas in a back-to-back layout cannot cover the whole circumference. However, if the antennas are improved, one group of antennas can cover the angle beyond 180°, and thus the two groups of antennas in the back-to-back layout can also be appropriate.

According to the positioning communication device, the positioning method and the computer storage medium in the embodiments of the disclosure, in the embodiments, the positioning communication device includes multiple positioning antenna groups, and the positioning ranges of the multiple positioning antenna groups relative to a center of the positioning communication device are at least partially different, so that the positioning range of the positioning communication device is increased, the positioning communication device can communicate with a beacon located at different positions relative to itself, and the range of the positioning beacon in positioning communication is expanded. For example, the positioning communication device can position the beacon located at each orientation. On the other hand, the problem, such as the inaccuracy of positioning on a side or a back in the related art, is not generated overall. Hence, the positioning communication device and the positioning method in the embodiments have the characteristics of wide positioning range and high positioning accuracy. Meanwhile, the multiple positioning antenna groups are connected to the processing module via the selection switching module, so that the multiple positioning antenna groups can share one processing module, and thus the number of the processing modules is reduced, the structure of the positioning communication device is simplified, the hardware cost of the positioning communication device is reduced, and the miniaturization, lightness and thinness of the positioning communication device are benefited.

In the several embodiments in the disclosure, it should be understood that the disclosed device and method can be implemented in other manners. For example, the described equipment embodiment is only schematic, and for example, division of the units is only logic function division, and other division manners can be adopted during practical implementation. For example, multiple units or components can be combined or integrated into another system, or some characteristics can be neglected or not executed. In addition, coupling, or direct coupling or communication connection between each displayed or discussed component can be indirect coupling or communication connection, implemented through some interfaces, of the equipment or the units, and can be electrical and mechanical or adopt other forms.

The units described as separate parts can or cannot be physically separated, and parts displayed as units can or cannot be physical units, and namely can be located in the same place, or can also be distributed to multiple network units. Part or all of the units can be selected to achieve the purpose of the solutions of the embodiments according to a practical requirement.

In addition, each function unit in each embodiment of the disclosure can be integrated into a processing module, each unit can also exist independently, and two or more than two units can also be integrated into one unit. The integrated unit can be implemented in a hardware form, and can also be implemented in form of hardware and software function unit.

Those of ordinary skill in the art should know that: all or part of the steps of the abovementioned method embodiment can be implemented by instructing related hardware through a program, the abovementioned program can be stored in a computer-readable storage medium, and the program is executed to execute the steps of the abovementioned method embodiment; and the storage medium includes: various media capable of storing program codes such as mobile storage equipment, a Read-Only Memory (ROM), a Random Access Memory (RAM), a magnetic disk or an optical disc.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

The invention claimed is:

1. A positioning communication device, comprising:
at least two positioning antenna groups, at least configured to receive a positioning signal sent by a beacon, wherein each positioning antenna group comprises two positioning antennas disposed separately, and positioning ranges of different positioning antenna groups are at least partially different;
a selection switching module, respectively connected to the at least two positioning antenna groups; and
a processing module, connected to the positioning antenna groups via the selection switching module, and configured to control, according to orientation information of the beacon at a previous moment, a positioning antenna group conducted by the selection switching module, and determine, according to the positioning signal received by the conducted positioning antenna group, orientation information of the beacon at a current moment;
wherein positioning ranges of two adjacent positioning antenna groups are partially overlapped to form an overlapped area, and a positioning border of two adjacent positioning antenna groups is disposed in the overlapped area;
wherein the processing module is configured to determine, according to the orientation information at the previous moment, whether the beacon crosses the positioning border for a first preset angle, and control, when the beacon crosses the positioning border of the two adjacent positioning antenna groups for the first preset angle, the selection switching module to conduct the corresponding positioning antenna group to avoid the conducted positioning antenna group being switched back and forth.

2. The positioning communication device of claim 1, wherein
positioning ranges of the at least two positioning antenna groups are merged to form a positioning range of 360°.

3. The positioning communication device of claim 1, wherein
an angle of the overlapped area is a second preset angle;
the positioning border is located at a central position of the overlapped area;
N positioning antenna groups are provided, where N is a positive integer not smaller than 2; and
a receiving angle of one positioning antenna group is not smaller than a sum of 360/N and the second preset angle.

4. The positioning communication device of claim 3, wherein
the first preset angle is smaller than or equal to one half of the second preset angle.

5. The positioning communication device of claim 1, wherein
the processing module is further configured to control the selection switching module to sequentially conduct the positioning antenna groups in a positioning preparatory stage, determine initial orientation information of the beacon according to the positioning signals provided by the positioning antenna groups, and determine, according to the initial orientation information, a first positioning antenna group to be conducted in a positioning stage and activate beacon positioning.

6. A positioning method, comprising:
controlling a positioning antenna group conducted by a selection switching module according to orientation information of a beacon relative to a positioning communication device at a previous moment, wherein positioning ranges of different positioning antenna groups are at least partially different;
at least receiving, by the conducted positioning antenna group, a positioning signal sent by the beacon; and
determining orientation information of the beacon at a current moment according to the positioning signal;
wherein positioning ranges of two adjacent positioning antenna groups are partially overlapped to form an overlapped area, a positioning border of two adjacent positioning antenna groups is disposed in the overlapped area, and the controlling the conducted positioning antenna group according to the orientation information of the beacon relative to the positioning communication device at the previous moment comprises:
determining, according to the orientation information at the previous moment, whether the beacon crosses the positioning border for a first preset angle; and
controlling, when the beacon crosses the positioning border of the two adjacent positioning antenna groups for the first preset angle, the selection switching module to conduct the corresponding positioning antenna group to avoid the conducted positioning antenna group being switched back and forth.

7. The method of claim 6, further comprising:
controlling the selection switching module to sequentially switch the conducted positioning antenna groups in a positioning preparatory stage;
determining initial orientation information of the beacon relative to the positioning communication device according to the positioning signals provided by the positioning antenna groups; and
determining, according to the initial orientation information, a first positioning antenna group to be conducted in a positioning stage, and activating beacon positioning.

8. A non-transitory computer storage medium, storing a computer executable instruction, and the computer executable instruction being capable of implementing, after being executed, a positioning communication method, comprising:
controlling a positioning antenna group conducted by a selection switching module according to orientation information of a beacon relative to a positioning communication device at a previous moment, wherein positioning ranges of different positioning antenna groups are at least partially different;
at least receiving, by the conducted positioning antenna group, a positioning signal sent by the beacon; and
determining orientation information of the beacon at a current moment according to the positioning signal;
wherein positioning ranges of two adjacent positioning antenna groups are partially overlapped to form an overlapped area, a positioning border of two adjacent positioning antenna groups is disposed in the overlapped area, and the controlling the conducted positioning antenna group according to the orientation information of the beacon relative to the positioning communication device at the previous moment comprises:
determining, according to the orientation information at the previous moment, whether the beacon crosses the positioning border for a first preset angle; and controlling, when the beacon crosses the positioning border of the two adjacent positioning antenna groups for the first preset angle, the selection switching module to conduct the corresponding positioning antenna group to avoid the conducted positioning antenna group being switched back and forth.

9. The non-transitory computer storage medium of claim 8, further comprising:
controlling the selection switching module to sequentially switch the conducted positioning antenna groups in a positioning preparatory stage;
determining initial orientation information of the beacon relative to the positioning communication device according to the positioning signals provided by the positioning antenna groups; and
determining, according to the initial orientation information, a first positioning antenna group to be conducted in a positioning stage, and activating beacon positioning.

\* \* \* \* \*